(12) United States Patent
Edwards (10) Patent No.: US 6,411,272 B1
(45) Date of Patent: Jun. 25, 2002

(54) ACTIVE MATRIX LIQUID CRYSTAL DISPLAY DEVICES

(75) Inventor: Martin J. Edwards, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/439,454

(22) Filed: Nov. 15, 1999

(30) Foreign Application Priority Data

Nov. 27, 1998 (GB) .............................................. 9825868

(51) Int. Cl.$^7$ ................................................. G09G 3/36
(52) U.S. Cl. ............................. 345/87; 345/92; 345/93; 345/94; 345/96; 345/100; 345/206; 257/59; 257/350; 349/43; 349/47; 349/49; 349/151; 349/152
(58) Field of Search .......................... 345/87, 206, 98, 345/204, 100, 92, 93, 94, 96; 349/47, 43, 49, 151, 152, 42, 138; 257/72, 350, 59

(56) References Cited

U.S. PATENT DOCUMENTS

| | | | |
|---|---|---|---|
| 5,130,829 A | 7/1992 | Shannon | 359/59 |
| 5,641,974 A | 6/1997 | Den Boer et al. | 257/59 |
| 6,100,951 A | * | 8/2000 | Oversluizen et al. ......... 349/49 |
| 6,246,460 B1 | * | 6/2001 | Young ......................... 349/151 |

FOREIGN PATENT DOCUMENTS

EP 0617310 A1 9/1994 ......... G02F/1/1335

* cited by examiner

*Primary Examiner*—Richard Hjerpe
*Assistant Examiner*—Ali Zamani (57) ABSTRACT

An active matrix LC display device comprising an array of display elements (10), each having a switching device (12) addressed via sets of row and column address conductors (14, 16) connected respectively to a row scanning circuit (30) and a column drive circuit (35) providing data signals. The column drive circuit is operable in a manner such that an output thereof associated with one column conductor becomes high impedance prior to or while a data signal is applied to an adjacent column conductor. Unwanted display artefacts resulting from this kind of operation are avoided by arranging the column conductor (16) associated with a display element to lie inwardly of the edges of the display element electrode (18), for example towards the central axis of the electrode, in order to reduce capacitive coupling effects. Such an arrangement of the column conductors is particularly beneficial when using a multiplexing type of column drive circuit and in the kind of display device in which the display element electrodes are carried on an interlayer of insulating material above the switching devices and sets of address conductors.

17 Claims, 6 Drawing Sheets

ACTIVE MATRIX LIQUID CRYSTAL DISPLAY DEVICES

BACKGROUND OF THE INVENTION

The present invention relates to an active matrix liquid crystal display device comprising a row and column array of liquid crystal display elements, each display element comprising a display element electrode connected to an associated switching device, sets of row and column address conductors connected to the display elements and via which selection signals and data signals respectively are applied to the display elements, a row drive circuit for applying selection signals to the set of row address conductors, and a column drive circuit for applying data signals to the set of column address conductors via respective outputs, which column drive circuit is operable such that an output thereof associated with one column address conductor becomes high impedance prior to or while the data signal for an adjacent column address conductor is applied.

Active matrix liquid crystal display devices suitable for displaying datagraphic or video information are well known. Typical examples of such, and the general manner in which they operate, are described in U.S. Pat. No. 5,130,829. In these devices, the display element electrodes, organised in rows and columns, are provided on a first substrate together with the switching devices, in the form of TFTs (thin film transistors), and the sets of row and column address conductors. A second substrate carrying a transparent common electrode is arranged spaced from the first substrate and LC (liquid crystal) material is disposed between the two substrates, with each display element being defined by a respective display element electrode and the overlying portion of the common electrode together with the LC material therebetween. Each display element electrode is connected to the drain electrode of its associated TFT. The TFT of each display element is connected to respective ones of the row and column address conductors with the gates of all the TFTs in a row of display elements being connected to a respective row address conductor and the source electrodes of all the TFTs in a column of display elements being connected to a respective column address conductor. Each display element electrode is situated adjacent the intersection of its associated row and column conductors, which extend along two adjoining sides of the electrode. Adjacent row and column conductors extend along the other sides of the electrode so that each display element electrode is bordered by adjacent pairs of row conductors and column conductors. A row drive circuit connected to the set of row address conductors scans the row conductors and applies a selection (gating) signal to each row conductor in sequence to turn on the TFTs of a row of display elements and a column drive circuit connected to the set of column conductors applies data signals to the column conductors in synchronism with scanning of the row conductors by the row drive circuit whereby the display elements of a selected row are charged via their respective TFTs to a level dependent on the value of the data signal on their associated column conductors to produce a required display output. The rows are driven individually in turn during respective row address periods in this manner so as to build up a display picture over one field period, and the array of display elements is repeatedly addressed in similar manner in successive field periods.

For convenience of manufacture and compactness, the row and/or column drive circuits in some display devices, and particularly those using polysilicon TFTs, have been integrated on the substrate carrying the TFTs peripherally of the display element array using the same large area electronics technology as that employed for the active matrix circuitry of the display element array with the circuitry of the drive circuits being fabricated simultaneously with the active matrix circuitry and similarly comprising TFTs, conductor lines, etc. This avoids the need to use separately manufactured drive circuits that need to be interconnected to the address conductors of the display element array on the substrate. Due to limitations in the performance of the TFTs and the kinds of circuit possible when using TFTs, the column drive circuit is customarily provided in the form of a simple multiplexing circuit, examples are which are described in the paper entitled "Fully Integrated Poly-Si TFT CMOS Drivers for Self-Scanned Light Valve" by Y. Nishihara et al in SID 92 Digest, pages 609–612, and in the paper entitled "A 1.8-in Poly-Si TFT—LCD for HDTV Projectors with a 5-V Fully Integrated Driver" by S. Higashi et al in SID 95 Digest, pages 81 to 84. Such a circuit operates in the manner described in the opening paragraph. Their general operation is based on a multiplexing technique in which analogue video information (data) is sequentially transferred via multiplexing switches from video input lines to corresponding groups or blocks of column address conductors in the display. The video information is applied simultaneously to a number of video input lines and transferred via the multiplexing switches to a corresponding number of column address conductors. During a row address (video line) period each group of column conductors is charged in turn until all the column conductors in the display device have been charged to a level corresponding to the level of the video information on the input lines. Once a group of column conductors has been charged the associated multiplexing switches open and the column conductors become high impedance nodes with the voltage applied being maintained on the column conductor capacitance and the next group is charged. The circuit operates in this manner so as to charge all the groups in sequence and to drive each row of display elements in turn in this way during respective row address periods.

Whilst the provision of an integrated, multiplexing type, column drive circuit has benefits with regard to the simplication of fabrication of the display device, it has been found that problems can occur in the display output from the display element array during operation of the device. Certain columns in the array show errors in their display brightness, for example a lack of display uniformity when displaying grey fields which manifests itself as highly visible vertical lines in the displayed image.

SUMMARY OF THE INVENTION

It is an object of the present invention to provide an active matrix display device of the kind using a column drive circuit which operates in the manner of a multiplexing circuit in which the problem of the aforementioned undesirable display output artifacts is overcome or reduced at least to some extent.

According to the present invention there is provided an active matrix liquid crystal display device of the kind described in the opening paragraph which is characterised in that the column address conductor associated with a display element is arranged to lie inwardly of the display element electrode edges. Preferably, the column address conductor is positioned towards the middle of the display element electrode. As a result of arranging the column address conductors in this way, it has been found that the extent of unwanted display artefacts in the form of visible vertical lines is at least considerably reduced.

The invention stems from an appreciation of the reason for these display artefacts when using a multiplexing type of column drive circuit. In the conventional display element lay-out, a column address conductor associated with a particular display element extends alongside one vertical edge, or side, of the display element electrode and another column address conductor, associated with the adjacent column of display elements, extends alongside the opposing vertical edge. Thus, each column conductor extends between an adjacent pair of display element electrodes in a row and alongside the facing edges of the electrodes. The capacitance coupling between an adjacent pair of column address conductors indirectly via the electrode can therefore be significant. Direct capacitive coupling between two column conductors can occur in the case of an alternative lay-out in which pairs of column conductors are provided adjacent one another and columns of display element electrodes are provided to either side of the pair, one column of electrodes being addressed via one of column conductors and the other addressed via the second column conductor. The presence of such indirect or direct capacitance means that as the voltage on the first column conductor of one group is charged in operation of the column drive circuit the change in voltage can be coupled onto the last column conductor of the previously addressed group through this capacitance, thereby disturbing the voltage set on that last column conductor. The result is that errors occur in the voltage on the last column conductor of each group which errors cause the visible vertical lines in the displayed image. The problem is particularly apparent in high aperture type display devices, for example of the kind described in U.S. Pat. No. 564,194 and EP-A-0617310, in which the display element electrodes are carried on an insulating layer that extends over the active matrix circuitry, comprising the TFTs and sets of row and column address conductors, on the substrate and in which portions of the display element electrodes are arranged to overlap the two adjacent column address conductor (and row address conductors) so as to increase their effective apertures. Such overlap can result in significant capacitance existing between a column address conductor and the adjacent portions of the display element electrodes. By arranging the column address conductors in relation to the display element electrodes in accordance with the present invention the extent of capacitive couplings between adjacent column address conductors is considerably reduced. In these high aperture kinds of display devices, the column conductors can readily be arranged instead beneath the display element electrode and inwardly of its edges, for example substantially centrally, rather than close to the electrode edges as the electrodes are carried an insulating layer at a different level to the active matrix circuitry.

In the case of a display device operating in transmissive mode and using transparent conductive material such as ITO for the display element electrodes, then the provision of the column conductors inwardly of the electrode will reduce the effective pixel aperture slightly when the conductors are formed of a light opaque material such as a metal rather than a light transparent material. However, in the case of a reflective display device having light reflective display element electrodes, then disposing the conductors beneath the electrodes in this way does not affect the aperture.

When formed of metal, the column address conductors extending between adjacent columns of display element electrodes in the known display devices may serve also as light shields which together with metal row address conductors constitute a black matrix bordering the individual display elements for the purpose of enhancing display contrast. Because the column address conductors in the display device according to the present invention no longer occupy the gaps between the columns of display element electrodes it may be desirable to block these gaps so as to avoid the possibility of the display contrast being degraded. In a preferred embodiment, display element storage capacitor electrodes of light opaque material are utilised to mask these gaps. Other approaches such as using the row metallisation or other layers, e.g. black matrix on the other substrate, are also possible.

It is envisaged that the invention can be used beneficially in display devices using column drive circuits other than of the multiplexing type but which likewise operate in such a way that an output associated with one column conductor becomes high impedance before or while an adjacent column conductor is being supplied with a data signal as similar problems would be experienced.

BRIEF DESCRIPTION OF THE DRAWING

Embodiments of active matrix display devices in accordance with the present invention will now be described, by way of example, with reference to the accompanying drawings, in which.

It will be appreciated that the Figures are not drawn to scale and that certain dimensions may have been exaggerated whilst other dimensions may have been reduced. The same reference numerals are used throughout the Figures to denote the same or similar parts.

DESCRIPTION OF THE PREFERRED EMBODIMENTS

Figure 1:
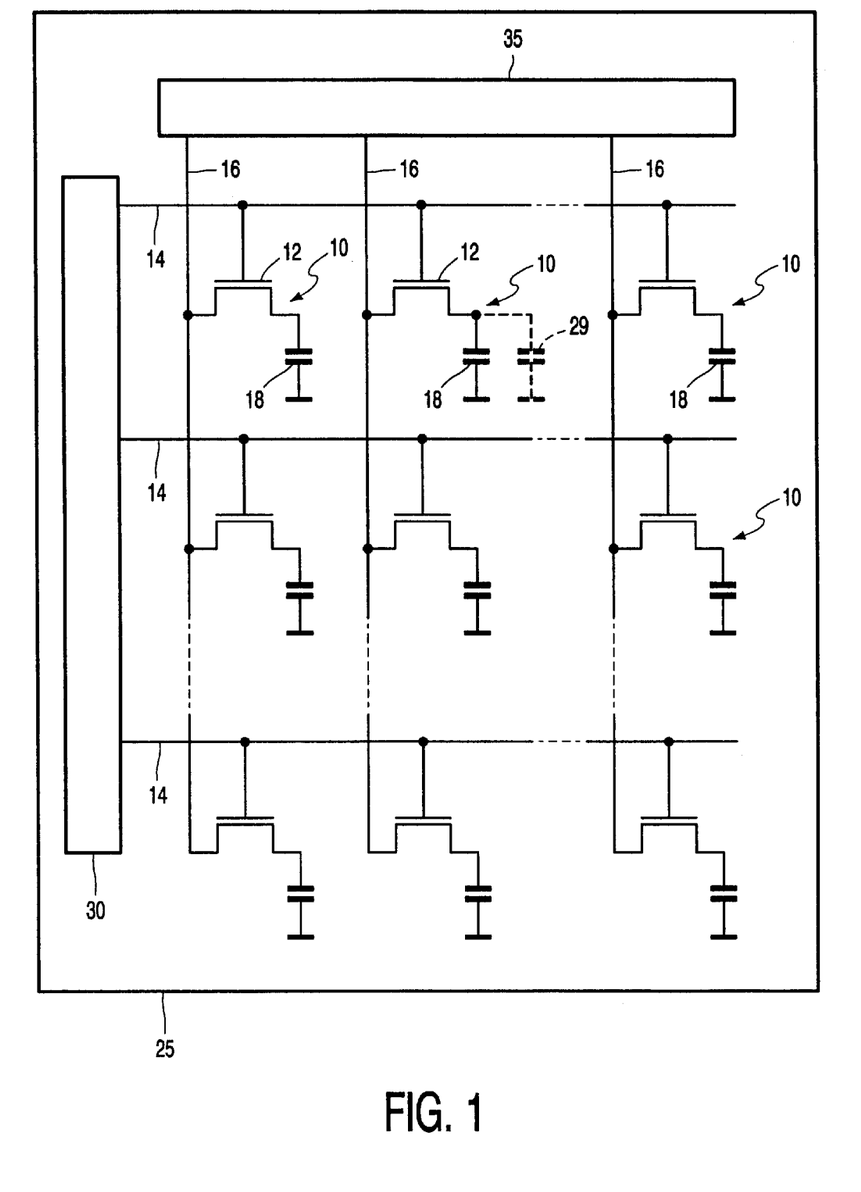
FIG. 1 is a simplified schematic circuit diagram of an active matrix LC display device.

Referring to FIG. 1, a simplified schematic circuit diagram of a generally conventional form of active matrix liquid crystal display device comprising a row and column array of liquid crystal display elements 10 is shown. The display elements each have an associated TFT 12 acting as a switching device, and are addressed via sets of row and column address conductors 14 and 16. Only few display elements are shown here for simplicity. In practice there can be several hundred rows and columns of display elements.

The drain of a TFT 12 is connected to a respective display element electrode 18 situated adjacent the intersection of respective row and column address conductors, while the gates of all the TFTs associated with a respective row of display elements 10 are connected to the same row address conductor 14 and the sources of all the TFTs associated with a respective column of display elements are connected to the same column address conductor 16. The sets of row and column address conductors 14, 16, the TFTs 12, and the picture element electrodes 18 are all carried on the same insulating substrate, for example of glass, and fabricated simultaneously using known thin film technology involving the deposition and photolithographic patterning of various conductive, insulating and semiconductive layers. A second glass substrate, (not shown) carrying a continuous transparent electrode common to all display elements in the array is arranged spaced from the substrate 25 and the two substrates are sealed together around the periphery of the display element array and separated by spacers to define an enclosed space in which liquid crystal material is contained. Each display element electrode 18 together with an overlying portion of the common electrode and the liquid crystal material therebetween defines a light-modulating display element.

Both the structure and operation of this device follow conventional practice, for example as described in U.S. Pat. No. 5,130,829 whose contents are incorporated herein. Scanning (gating) signals are applied to each row address conductor 14 in turn by a row drive circuit 30, comprising for example a digital shift register, and data signals are applied to the column conductors 16, in synchronisation with the gating signals, by a column drive circuit 35. Upon each row conductor being supplied with a gating signal, the TFTs 12 connected to that row conductor are turned on causing the respective display elements to be charged according to the level of the data signal then existing on their associated column conductors. After a row of display elements has been addressed in a respective row address period, corresponding for example to the line period of an applied video signal, their associated TFTs are turned off, upon termination of the gating signal, for the remainder of the field period in order to isolate electrically the display elements and ensure the applied charge is stored to maintain their display outputs until they are addressed again in a subsequent field period.

For a transmissive mode of operation, the display element electrodes 18 are formed of a light transparent conductive material such as ITO and the individual display elements serve to modulate light, which may be directed onto one side of the device, e.g. the substrate 25, from a backlight, according to their applied data signal voltage so that a display image, built up by addressing all the rows of display elements in the array, can be viewed from the other side. For a reflective mode of operation, the display element electrodes 18 are formed of light reflecting conductive material such as a metal, and light entering the front of the device through the substrate carrying the common electrode is modulated by the LC material at each display element and reflected by the reflective display element electrodes back through that substrate, depending on their display state, to generate a display image visible to a viewer at the front of the device.

Figure 2:
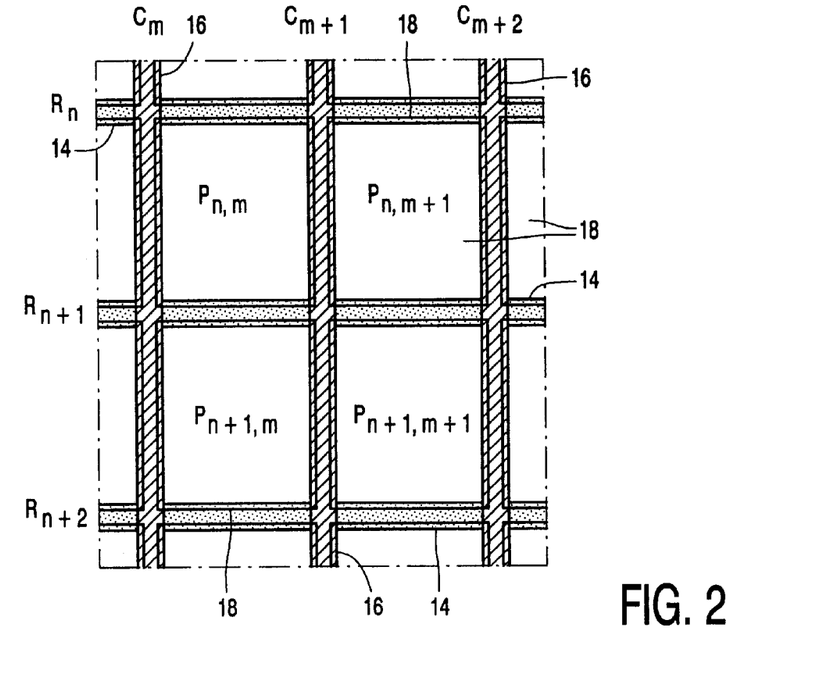
FIG. 2, illustrates schematically the lay-out of the display element electrodes and row and column address conductors in a typical part of a known active matrix LC display device of the high aperture kind.

An example of the physical arrangement of the display element electrodes and row and column address conductors in a typical portion of the array is depicted schematically in FIG. 2. The TFTs 12 have been omitted for the sake of clarity. The individual display element electrodes 18 are labelled Pn,m where n and m denote their respective row and column numbers. Thus, the electrode Pn,m is addressed via associated row and column conductors Rn and Cm, the electrode Pn,m+1 is addressed via the row and column conductors Rn and Cm+1, the electrode Pn+1,m is addressed via the row and column conductors Rn+1 and Cm, etc. The TFTs are located for example adjacent the intersection of the row and column conductors associated with the display element concerned.

In this particular example, the display device structure is of the kind providing a high aperture. To this end, the display element electrodes 18 are carried on layer of insulating material, for example of silicon nitride or an organic material such as polyimide or resist, that is disposed over the active matrix circuitry, comprising the sets of address conductors and the TFTs carried on the substrate, and are extended so as to partly overlap at their opposing vertical side edges the adjacent column conductors 16 and at their top and bottom edges the adjacent row conductors 14, as shown in FIG. 2. As will be apparent, therefore, each column conductor is overlapped by portions of the display element electrodes in two adjacent columns of display elements. Each display element electrode 18 is connected to the drain of its associated TFT underlying the insulating layer through a contact opening (not shown) formed in the insulating layer. The individual display element electrodes 18 are separated from their neighbours by a small gap lying over the row and column conductors. Examples of this type of structure are described in U.S. Pat. No. 5,641,974 and EP-A-0617310 to which reference is invited for a more detailed description.

In a transmission mode of operation, and assuming the address conductors are of a light opaque metal, the aperture of a display element then corresponds substantially to the area bordered by the adjacent pairs of row and column conductors. In a reflective mode, the aperture then corresponds instead to the area of the electrode 18.

Also in this particular display device, the row and column drive circuits 30 and 35 are for convenience and simplicity integrated on the substrate 25 and fabricated simultaneously with the active matrix array, comprising the display elements, TFTs and row and column address conductors, using the same thin film processing technology rather than being fabricated as separate components and requiring the provision of electrical interconnection means to connect their outputs with the row and column address conductors. Integrated drive circuits are well known, examples of such being described in the aforementioned papers. Normally polysilicon technology is used, although amorphous silicon technology can be employed instead in certain cases. With regard to the integrated column drive circuit 35, it is most usual to provide this in the form of a simple multiplexing type of circuit. The general operation of these circuits is based on a multiplexing technique in which analogue video information is sequentially transferred from one or more video input lines to corresponding groups of one or more of the columns address conductors in the display device. The video information is transferred via multiplexing switches which may consist of NMOS TFTs, PMOS TFTs or CMOS transmission gates. The switches, which each constitute an output of the multiplexing circuit associated with a respective column conductor, are operated in groups and when a group of switches is turned on the corresponding columns are charged to the voltage levels of the respective video lines. When the switches turn off the voltages on the column conductors are maintained by the capacitance of the column conductors and any additional storage capacitors which may be connected to them. During a video line period each group of multiplexing switches is turned on in sequence until all of the columns of display elements have been charged with the appropriate video information.

Figure 3:
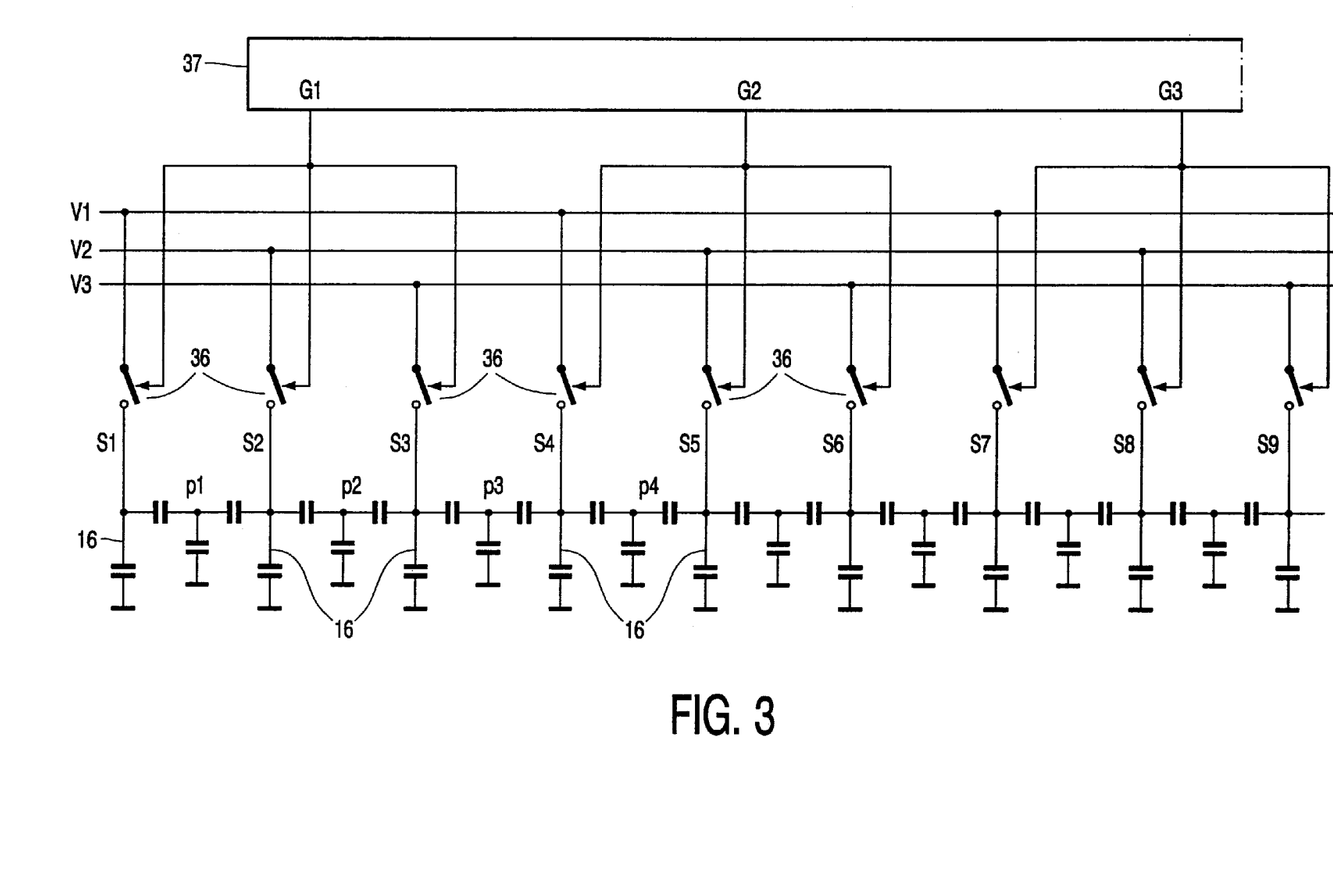
FIG. 3 illustrates schematically the circuit of a part of a column drive circuit and display element array of the display device of FIG. 1.

FIG. 3 illustrates in simplified schematic form a part of the multiplexing column drive circuit. In this relatively simple example, there are three video input lines, V1, V2 and V3, and the multiplexing switches, 36, are arranged in groups of three with their outputs connected to respective consecutive column address conductors 16. A control circuit 37 within the column drive circuit, and comprising a shift register, which may or may not be integrated on the substrate 25 with the multiplexing circuit, sequentially selects each of the groups of multiplexing switches using the control signals G1, G2, G3, etc so that at the end of the video line period all of the columns in the array have been charged. When G1 goes high the first three multiplexer switches 35 close and the first three columns S1, S2 and S3 are charged to the voltage level on the video lines V1, V2 and V3 respectively. G1 then goes low, the three multiplexer switches open, and the columns S1, S2 and S3 become isolated from the video lines. The voltage on the columns is then maintained on the column capacitance. Next, the control signal G2 goes high and the second group of three columns, S4, S5 and S6, is charged to the voltage then existing on the video lines. The operation of the multiplexing circuit continues in this way with each group of columns being charged appropriately in succession until all the column conductors in the array have been charged.

In operation of this known type of display device, using a multiplexing column drive circuit, problems have been experienced with display artefacts occurring in the form of visible vertical lines at regular intervals. It has been determined that these artefacts are caused by voltages being unintentionally capacitively coupled onto particular column conductors in operation of the column drive circuit resulting in an error in the voltages of the display elements associated with those column conductors and hence their output brightness. More particularly, such capacitive couplings are due to the fact that in this conventional display element arrangement the column address conductors 16 run between adjacent columns of display element electrodes 18. As a consequence, significant capacitance exists between a column address conductor and the adjacent display element electrodes. This is particularly the 30 case in a high aperture type of display element lay-out in which the display element electrodes partially overlie the column conductors.

Figure 4:
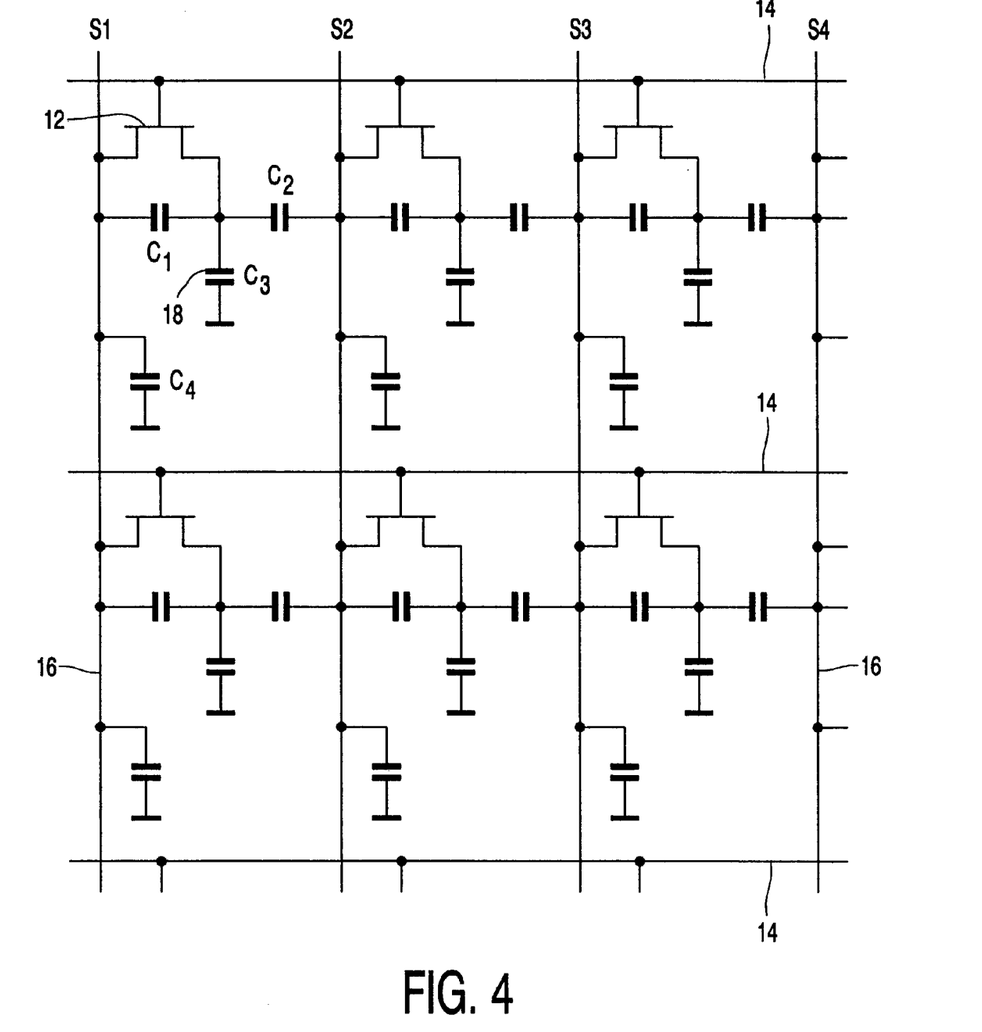
FIG. 4 shows the equivalent circuit of a part of the display element array of the display device of FIG. 1.
Figure 5:
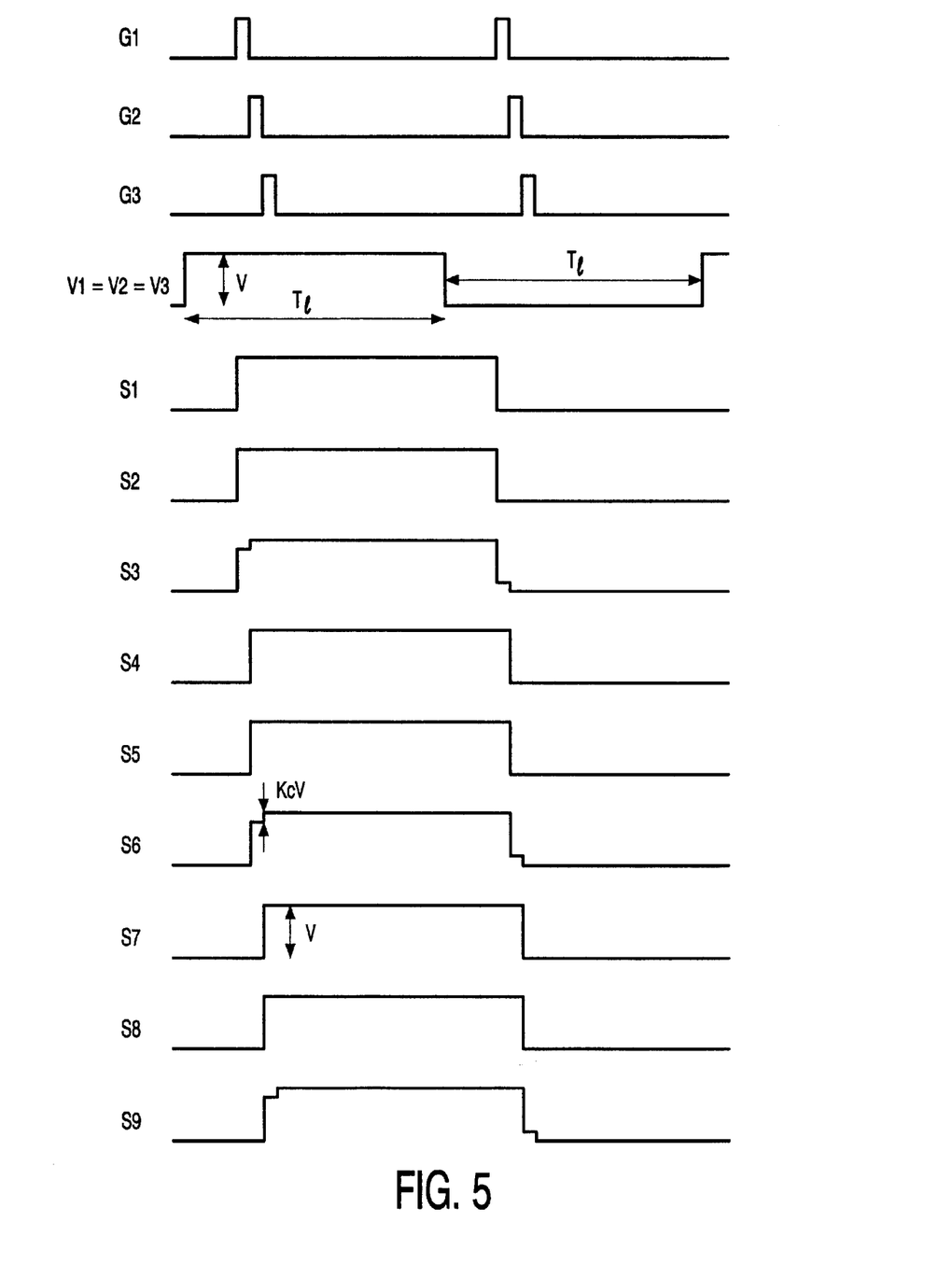
FIG. 5 illustrates typical drive waveforms present in operation of the display device of FIG. 1.

This effect will be described with reference also to FIG. 4 which shows an approximate equivalent circuit for a typical small number of display elements in the array, and to FIG. 5 which illustrates examples of certain voltage waveforms in operation of the circuit of FIG. 3. The display elements of the display device each contain a number of capacitances, some of which are shown in FIG. 4. $C_1$ and $C_2$ represent the capacitance between a display element electrode 18 and the two adjacent column conductors 16. $C_3$ represents the display element capacitance, which may be a combination of the liquid crystal capacitance and a display element storage capacitor. $C_4$ represents the capacitance of the column conductor and will include the capacitance between the column conductor and the row conductor and the capacitance between the column conductor and the common electrode of the display array. Other capacitances may also be present and may contribute to the effects described here but have been omitted from FIG. 4 for clarity.

The source of the column voltage errors will become apparent by considering the effect of a change in the video information on, for example, column conductor S2. This change in voltage is coupled onto the display element capacitor $C_3$ via capacitor $C_2$ and therefore causes a change in the display element voltage. If the voltage on column conductor S1 is not being maintained by the column drive circuit, i.e. the relevant column drive output becomes high impedance and column conductor S1 is floating, then this change in display element voltage can be further coupled onto the column conductor S1 via the capacitor $C_1$. This coupling of a change in voltage on one column conductor onto an adjacent column conductor can be denoted by a coupling factor Kc. If the voltage on the first column conductor changes by an amount $\Delta V$, then the change in voltage that this produces on the second column conductor is given by $Kc\Delta V$. This effect will be further explained with reference also to FIGS. 3 and 5. It is assumed here for simplicity that the display array is being addressed with a uniform, e.g. grey, field, and that row inversion of the polarity of the video information drive voltage is used, as well as the fact that the column drive circuit 35 has just three video input lines. Similar effects will occur for other inversion methods, for circuits with different numbers of video lines and when the displayed video information is more complex. In FIG. 5, G1, G2 and G3 are the control waveforms applied to the groups multiplexer switches 36 which include voltage signals for turning on these switches and S1 to S9 are the voltage waveforms appearing on the first nine column conductors. As the display is showing a uniform grey field, the voltage waveforms applied to the three video lines, V1 to V3, are the same, as signified in FIG. 5. The polarity of the signals inverts after each video line period (TI). The control circuit 37 within the column drive circuit sequentially selects each of the groups of multiplexing switches using the control signals G1, G2, G3 etc so that at the end of the video line period TI all of the columns in the display have been charged. When G1 goes high the first three multiplexer switches 36 close and the first group of three column conductors S1, S2 and S3 are charged to the voltage level on the respective video lines. When G1 returns to a low level the drive circuit outputs associated with columns S1, S2 and S3 become high impedance. When the second group is selected immediately thereafter by G2 going high, then as the voltage on column conductor S4 changes high, this change is coupled, with reduced amplitude, onto the display element electrodes of the display elements in the third column, represented by the node p3 in FIG. 3. The change in display element voltage is further coupled onto the column conductor S3 in the previously addressed group since this conductor is now isolated from the video lines. This results in an error in the column voltage as indicated in the voltage waveform for S3 in FIG. 5. This voltage change is also coupled further to column conductor S2 via the display element node p2 and then to column conductor S1 via node p1. However, at each stage of coupling the magnitude of the coupled signal is reduced by the factor Kc. It is therefore the error in the voltage on S3 which is of the most importance to the uniformity of the displayed image.

Once the second group of three columns has been charged the signal G2 goes low and the second set of multiplexer switches turns off. When the third group of columns is charged by G3 going high, coupling of the change in voltage on column conductor S7 causes an error in the voltage on column conductor S6. This effect occurs in a similar way for each group of columns in the array so that in general the last column in each multiplexer group will be subject to a significant voltage error. This error, which is a kind of cross-talk, manifests itself in the form of vertical lines being visible in the displayed image, the pitch of the lines corresponding to the width of the multiplexer groups. If the column drive circuit 35 has, for example, just a single video line then the effect will not produce separated vertical lines but will instead be seen as cross-talk of video information from one display element to its neighbour.

Figure 6:
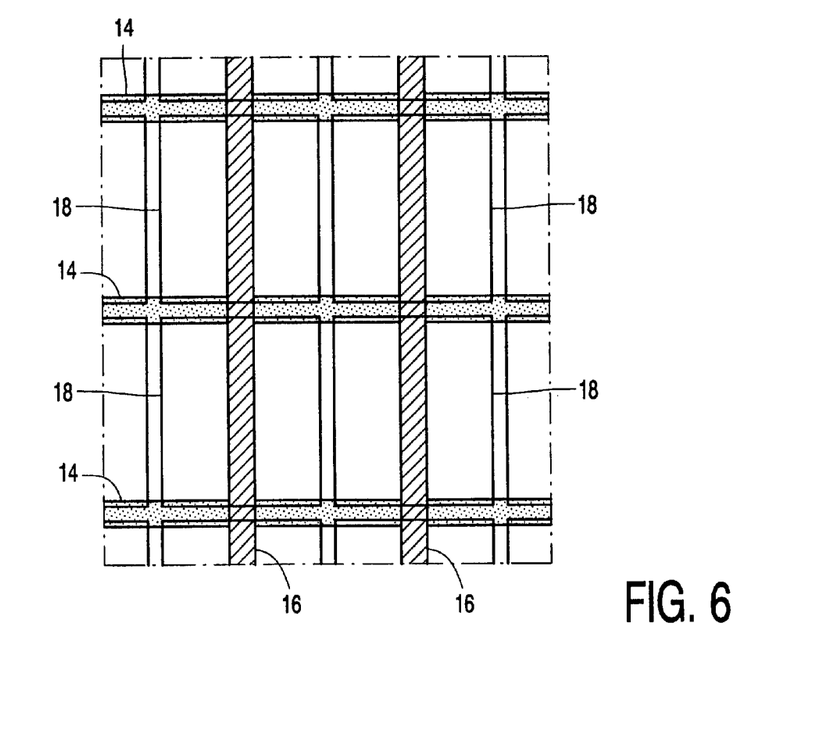
FIG. 6 illustrates schematically the arrangement of the display element electrodes and row and column address conductors in a first embodiment of display device in accordance with the present invention.
Figure 7:
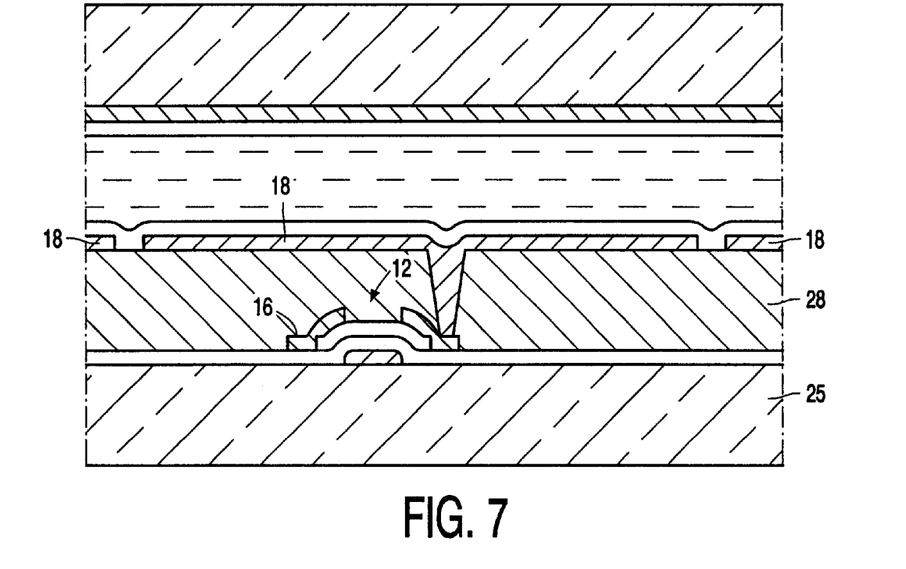
FIG. 7 is a schematic cross-sectional view through part of the display device of FIG. 6.

In order to avoid, or at least significantly reduce the visibility of, these display artefacts, the positioning of the column address conductors in relation to the display element electrodes is altered in accordance with the present invention. FIG. 6 shows schematically the display element lay-out in a typical part of the display element array in an embodiment of display device according to the invention. Comparing this with FIG. 2, it is seen that the column address conductors 16 no longer run between adjacent columns of display element electrodes 18 but instead are positioned away from the side edges of the electrodes and towards the centre of the display element electrodes with which they are respectively associated. Thus, each column address conductor 16 extends vertically (column wise) along, or close to, the central axis i.e. the middle of its associated column of electrodes and parallel with the vertical side edges of the electrodes. Again, the TFTs have been omitted for clarity, but in practice would be located beneath their respective display element electrodes close to the intersections between the row and column conductors. This modified arrangement of the column conductors 16 in relation to the electrodes 18 is simple to achieve, bearing in mind that the electrodes 18 are provided physically at a higher level that the sets of address conductors and the TFTs and carried on an insulating layer extending over those components. As before, the electrodes 18 each partly overlap adjacent row conductors 14 so as to provide increased aperture. The gaps between the opposing vertical edges of adjacent electrodes in the same row similar can remain the same as before. FIG. 7 is a schematic cross-sectional view through a part of the display device in the row direction comprising a typical display element 10 and showing the display element electrode 18 carried on the insulating interlayer, 28, over the active matrix circuitry comprising its associated TFT 12, column conductor 16 and row conductor (not visible) in this type of structure, with the electrode being connected to the drain of the TFT through a contact opening formed in the interlayer 28.

The effect of re-positioning the column conductors in this way is to greatly reduce the value of $C_2$ (FIG. 4). As a result of locating the column conductors towards the centre of the electrodes the capacitance $C_2$ between the display element electrode and the adjacent column conductor is decreased. The capacitance, $C_1$, between the display element and its own column conductor may remain unchanged or may increase depending on the details of the lay-out. As the capacitances $C_1$ and $C_2$ provide a path for the coupling of signals from one column to an adjacent column, with the degree of coupling depending on the values of $C_1$ and $C_2$, then the greatly reduced capacitance $C_2$ achieved with this arrangement consequently leads to a significant reduction in the extent of coupling, and hence improvement in display quality through significantly reducing or eliminating the aforementioned unwanted artefacts.

For optimum benefit, the column conductor preferably extends along the centre of the electrodes 18 in its associated column so as to be spaced as far as possible from both the adjacent columns of electrodes. However, for some benefit it may instead be positioned away from the centre but still inwardly of the vertical edges of the electrode. For example, the column conductor could be positioned to the left of the electrode central vertical axis so as to be further away from the next—addressed display element electrode column, assuming that the horizontal scan direction is fixed left to right. It is not necessary for the column conductors to extend in a straight line. If for some reason it is desired for example to position the TFT away from the centre line of a column of display elements the column conductors may be directed to connect with the TFTs accordingly in the spaces between adjacent display element electrodes in a column. Although it may be preferable for ease of construction for all the column conductors to be similarly positioned with respect to the display element electrode columns, the last column conductor in each group, e.g. S3, may be arranged to the left of the centre of the display element electrodes in that column so as to reduce the value of C2 for the display elements in this column still further.

Figure 8:
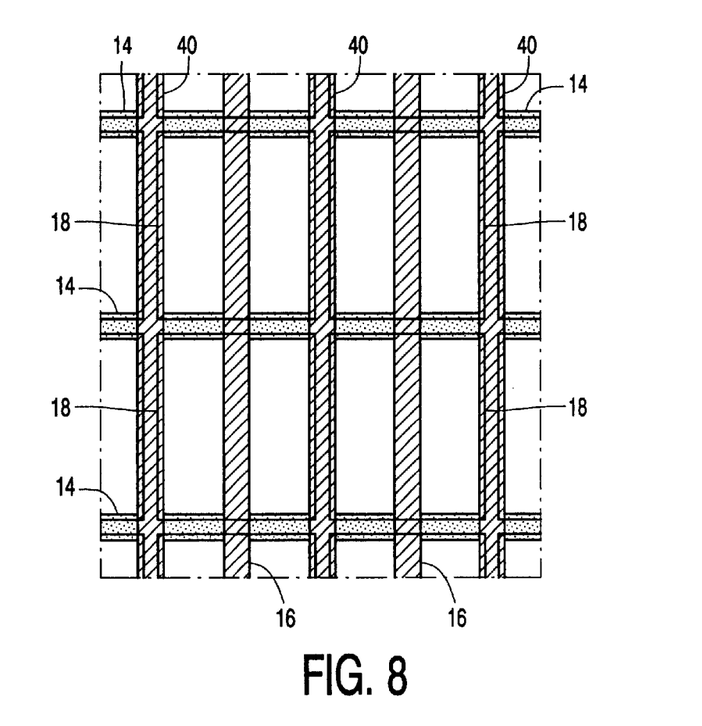
FIG. 8 illustrates schematically the arrangement of the display element electrodes, row and column address conductors and storage capacitor electrodes in a second embodiment of display device in accordance with the present invention.

Referring again to FIG. 6, and comparing this to the arrangement of FIG. 2, it will be appreciated that the gap between the opposing vertical edges of adjacent electrodes 18 in a row is now left open rather than being masked by the column conductors 16, assuming these are formed of light opaque material. In order to avoid the contrast of the display being degraded, it may be desirable to block these gaps. It is conventional in TFT LC display devices to provide a storage capacitor for each display element which is connected in parallel with the display element capacitance, for example as shown in ghosted outline at 29 in FIG. 1, and one simple approach to achieving this objective is to utilise display element storage capacitor electrodes to mask the gaps when such storage capacitors are provided in the array for the display elements, as shown in FIG. 8. Referring to this figure, the structure is basically the same as in FIG. 6 except that light opaque, metal, electrodes 40 extending in the column direction are provided, each of which is situated approximately mid-way between an adjacent pair of column conductors 16 under the insulating layer and beneath the gap between adjacent columns of electrodes 18. Each of the electrodes 40 provides in combination with an overlying edge portion of an electrode 18, and the intervening dielectric of the insulating layer, a storage capacitance in parallel with the LC display element capacitance to assist in maintaining the voltage stored on the display element. The electrodes 40 for this purpose are held at a fixed potential and consequently do not contribute to unwanted capacitive coupling effects.

Other approaches to masking these gaps such as the utilisation of the row conductor metallisation or other layers could be used instead.

If the column address conductors 16 are formed of metal, then the location of these inwardly of the side edges of the display element electrodes will reduce to an extent the display element aperture if the display device is operating in a transmissive mode. If, though, the conductors are formed of a transparent conductive material such as ITO the aperture is effectively unchanged. For a display device operating in reflective mode, the arrangement of the column conductors in this way is not relevant.

In a colour display device, colour filter elements are carried on the other substrate in conventional manner and in this case the video input lines V1, V2 and V3 may each carry a respective colour, red, green and blue, video information component with adjacent columns in the array being arranged to display red, green and blue information.

While the invention has been described in relation to a kind of display device structure in which the display element electrodes are carried above the active matrix circuitry on an insulating layer in particular, it is applicable to other types of display structures in which the electrodes 18 are situated at a similar level to, and laterally of, the TFTs and sets of addressed conductors, for example of the kind described in U.S. Pat. No. 5,130,829.

The part of the column drive circuit which supplies the video signal to the video input lines (e.g. V1, V2 and V3) and the control circuit 37 which applies control signals, G1, G2, G3, etc to the multiplexer switches need not be integrated on the substrate 25 but instead formed separately and connected to the multiplexing circuit on the substrate.

Moreover, whilst it is particularly convenient for at least the multiplexing circuit of the column drive circuit to be fully integrated on the same substrate as the active matrix circuitry, this part of the drive circuit, and likewise the row drive circuit, can of course be fabricated as a separate component and electrically interconnected with the active matrix circuitry, for example using chip-on-glass technology.

From reading the present disclosure, other modifications will be apparent to persons skilled in the art. Such modifications may involve other features which are already known in the field of active matrix LC display devices and component parts thereof and which may be used instead of or in addition to features already described herein.

What is claimed is:

1. An active matrix liquid crystal display device comprising: a row and column array of liquid crystal display elements, each display element comprising a display element electrode connected to an associated switching device, sets of row and column address conductors connected to the display elements and via which selection signals and data signals respectively are applied to the display elements, a row drive circuit for applying selection signals to the set of row address conductors, and a column drive circuit for applying data signals to the set of column address conductors via respective outputs, the column drive circuit being operable such that an output thereof associated with one column address conductor becomes high impedance prior to or while the data signal for an adjacent column address conductor is applied, and wherein the column address conductor associated with a display element is arranged to lie inwardly of the display element electrode edges.

2. An active matrix liquid crystal display device comprising: a row and column array of liquid crystal display elements, each display element comprising a display element electrode connected to an associated switching device, sets of row and column address conductors connected to the display elements and via which selection signals and data signals respectively are applied to the display elements, a row drive circuit for applying selection signals to the set of row address conductors, and a column drive circuit for applying data signals to the set of column address conductors via respective outputs, the column drive circuit being operable such that an output thereof associated with one column address conductor becomes high impedance prior to or while the data signal for an adjacent column address conductor is applied, and wherein the column address conductor associated with a display element is arranged to lie inwardly of the display element electrode edges and the column address conductor associated with a display element is positioned towards the center of the display element electrode.

3. An active matrix display device according to claim 1, wherein the display element electrodes are carried on an insulating layer which extends over the sets of address conductors.

4. An active matrix display device according to claim 1, wherein the column drive circuit comprises a multiplexing circuit integrated on a substrate carrying the array of display element electrodes and sets of address conductors.

5. An active matrix display device according to claim 1, wherein gaps between adjacent columns of display element electrodes are covered by light opaque material.

6. An active matrix display device according to claim 5, wherein the light opaque material covering each of said gaps comprises a metal electrode which partially overlaps the display element electrodes in a column and provides in combination therewith a storage capacitance for the column of display elements.

7. An active matrix display device according to claim 2, wherein the display element electrodes are carried on an insulating layer which extends over the sets of address conductors.

8. An active matrix display device according to claim 2, wherein gaps between adjacent columns of display element electrodes are covered by light opaque material.

9. An active matrix display device according to claim 8, wherein the light opaque material covering each of said gaps comprises a metal electrode which partially overlaps the display element electrodes in a column and provides in combination therewith a storage capacitance for the column of display elements.

10. An active matrix display device according to claim 3, wherein gaps between adjacent columns of display element electrodes are covered by light opaque material.

11. An active matrix liquid crystal display device as claimed in claim 1 further comprising a substrate supporting at least one set of address conductors and the switching devices,
an insulating layer which extends over said one set of address conductors and carries the display element electrodes, and wherein
the display element electrodes are connected to terminals of respective switching devices via contact openings in the insulating layer.

12. An active matrix liquid crystal display device as claimed in claim 7 further comprising a substrate supporting at least one set of address conductors and the switching devices, and wherein
the display element electrodes are connected to terminals of respective switching devices via contact openings in the insulating layer.

13. An active matrix liquid crystal display device as claimed in claim 1 further comprising:
an insulating substrate which carries the sets of row and column address conductors, the display element electrodes and the associated switching devices, and
a further transparent substrate spaced apart from said insulating substrate and which carries a continuous transparent electrode common to all of the liquid crystal display elements.

14. An active matrix liquid crystal display device as claimed in claim 1 wherein said column address conductor is coextensive with at least a part of said display element electrode.

15. An active matrix liquid crystal display device as claimed in claim 1 wherein gaps are present between adjacent columns of display element electrodes.

16. An active matrix liquid crystal display device as claimed in claim 1 further comprising a substrate supporting at least one set of address conductors and the switching devices, and
an insulating layer which extends over said one set of address conductors and switching devices and carries the display element electrodes.

17. An active matrix liquid crystal display device as claimed in claim 6 wherein the light opaque metal electrodes are held at a fixed voltage.

* * * * *